United States Patent
Mörz et al.

(10) Patent No.: US 11,880,525 B2
(45) Date of Patent: Jan. 23, 2024

(54) METHOD AND DEVICE FOR SELECTING INPUT FIELDS DISPLAYED ON A SCREEN AND/OR FOR ACTIVATING INPUT CONTENT DISPLAYED IN A SELECTED INPUT FIELD ON THE SCREEN BY MEANS OF MANUAL INPUTS

(71) Applicant: MERCEDES-BENZ GROUP AG, Stuttgart (DE)

(72) Inventors: Sebastian Mörz, Sindelfingen (DE); Konrad Flachs, Stuttgart (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 16 days.

(21) Appl. No.: 17/912,735

(22) PCT Filed: Mar. 11, 2021

(86) PCT No.: PCT/EP2021/056144
§ 371 (c)(1),
(2) Date: Sep. 19, 2022

(87) PCT Pub. No.: WO2021/185664
PCT Pub. Date: Sep. 23, 2021

(65) Prior Publication Data
US 2023/0126061 A1    Apr. 27, 2023

(30) Foreign Application Priority Data

Mar. 20, 2020    (DE) ............... 10 2020 107 752.1

(51) Int. Cl.
*G06F 3/041*    (2006.01)
*G06F 3/01*    (2006.01)
*G06F 3/04883*    (2022.01)

(52) U.S. Cl.
CPC ............ *G06F 3/0414* (2013.01); *G06F 3/016* (2013.01); *G06F 3/04883* (2013.01)

(58) Field of Classification Search
CPC .... G06F 3/017; G06F 3/04883; G06F 3/0487; G06F 3/0488; G06F 3/04886;
(Continued)

(56) References Cited

U.S. PATENT DOCUMENTS 8,970,525 B1 * 3/2015 de los Reyes ........ G06F 3/0414
345/173
9,720,587 B2    8/2017 Matsuki
(Continued)

FOREIGN PATENT DOCUMENTS

WO    2018213451 A1    11/2018

OTHER PUBLICATIONS

Communication dated May 27, 2022 in related/corresponding EP Application No. 21712447.8.
(Continued)

*Primary Examiner* — William Lu
(74) *Attorney, Agent, or Firm* — PATENT PORTFOLIO BUILDERS PLLC

(57) ABSTRACT

A method and device for selecting input fields displayed on a screen and/or for activating input content displayed in a selected input field on the screen by manual inputs into an input area of an input interface. The input interface is designed for the haptic input of gestures into the input area, in order to control the selection of an input field, and for the activation of input content of a selected input field by triggering an electrical switching function of the input interface by means of exerting a predefined minimum force on the input area. A displacement vector $V(POS(t_1),POS(t_2))$ is determined from determined input positions $POS(t_1),POS(t_2)$ of a manual, continuous input of gestures into the input (Continued)

Figure 1A:
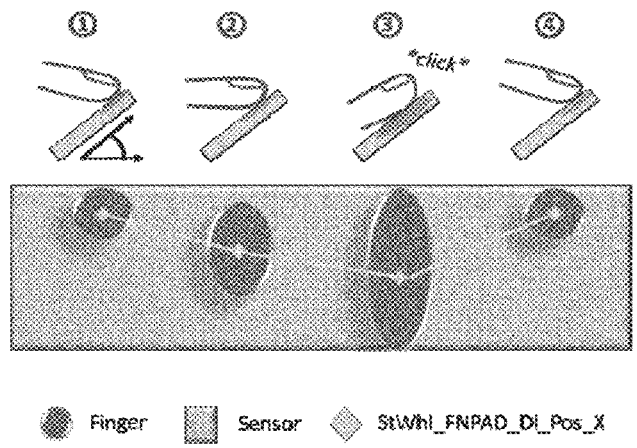

Finger      Sensor      StWhl_FNPAD_DI_Pos_X area at a first point in time $t_1$ and a second point in time $t_2$, where t:=time and $t_1$<$t_2$. An absolute value |F(t)| of a surface area F(t), with which the manual gesture input acts on the input area is determined. Provided that: |F($t_2$)|<|F($t_1$)|: the input field adjacent or at least closest to a position $POS_{SCREEN}$(POS($t_1$)) associated with the position POS($t_1$) on the screen as seen in the direction of the displacement vector V(POS($t_1$),POS($t_2$)) is selected. Triggering the electrical switching function at the point in time $t_2$ activates a function associated with the input content of this input field, and, provided that (|F($t_2$)|>|F($t_1$)|), the displacement vector V(POS($t_1$),POS($t_2$)) is disregarded and the function associated with the position $POS_{SCREEN}$(POS($t_1$)) is activated.

7 Claims, 7 Drawing Sheets

(58) Field of Classification Search
CPC ......... G06F 2203/04808; G06F 3/0414; G06F 3/016; G06F 3/0416
See application file for complete search history.

(56) References Cited

U.S. PATENT DOCUMENTS

| | | | |
|---|---|---|---|
| 10,877,660 B2* | 12/2020 | Harper | G06F 3/0488 |
| 2008/0041640 A1 | 2/2008 | Gillespie et al. | |
| 2009/0091479 A1* | 4/2009 | Sinha | G06F 3/016 341/22 |
| 2011/0134061 A1 | 6/2011 | Lim | |
| 2011/0210850 A1 | 9/2011 | Tran | |
| 2013/0096849 A1* | 4/2013 | Campbell | G06F 3/04144 702/41 |
| 2015/0062052 A1* | 3/2015 | Bernstein | G06F 3/0416 345/173 |
| 2015/0067559 A1* | 3/2015 | Missig | G06F 3/0481 715/765 |
| 2015/0097796 A1* | 4/2015 | Lisseman | B62D 1/04 345/173 |
| 2015/0138155 A1* | 5/2015 | Bernstein | G06F 3/0488 345/174 |
| 2016/0077620 A1* | 3/2016 | Choi | G06F 3/041 345/173 |
| 2016/0259528 A1* | 9/2016 | Foss | G06F 3/04842 |
| 2016/0259536 A1* | 9/2016 | Kudurshian | G06F 3/04847 |
| 2017/0046038 A1* | 2/2017 | Hajas | G06F 3/04166 |
| 2017/0102277 A1* | 4/2017 | Bandi | G01L 1/241 |
| 2017/0220112 A1* | 8/2017 | Nakamura | B06B 1/0611 |
| 2017/0357358 A1* | 12/2017 | Teutschler | G06F 3/0484 |
| 2017/0357376 A1* | 12/2017 | Westerman | G06F 3/0418 |
| 2020/0169522 A1* | 5/2020 | Lee | H04L 51/224 |

OTHER PUBLICATIONS

Decision to Grant dated Aug. 25, 2022 in related/corresponding EP Application No. 21712447.8.
International Search Report dated Jun. 1, 2021 in related/corresponding International Application No. PCT/EP2021/056144.
Office Action dated Jan. 19, 2021 in related/corresponding DE Application No. 102020107752.1.
Written Opinion dated Jun. 1, 2021 in related/corresponding International Application No. PCT/EP2021/056144.

* cited by examiner

METHOD AND DEVICE FOR SELECTING INPUT FIELDS DISPLAYED ON A SCREEN AND/OR FOR ACTIVATING INPUT CONTENT DISPLAYED IN A SELECTED INPUT FIELD ON THE SCREEN BY MEANS OF MANUAL INPUTS

BACKGROUND AND SUMMARY OF THE INVENTION

Exemplary embodiments of the invention relate to a method and a device for selecting input fields displayed on a screen and/or for activating input content displayed in a selected input field on the screen by means of manual inputs into an input area of an input interface, wherein the input interface is designed for the haptic input of gestures into the input area, in order to control the selection of an input field, and for the activation of input content of a selected input field by triggering an electrical switching function of the input interface by means of exerting a predefined minimum force on the input area.

It is known to input gestures into a touch-sensitive input field of an input interface from a multiplicity of input fields (e.g., rows, columns, or other forms of input regions on the screen), which are displayed on a screen and store input content, in order to select a displayed input field and thus the stored content. It is furthermore known to activate input content of a selected input field by way of haptic inputs into the input interface, in particular by exerting a predefined minimum force on the input field.

Thus, US 2011/0134061 A1 discloses a method in which different functions are executed depending on sensor signal curves brought about by haptic inputs into a touch-sensitive input field.

Exemplary embodiments of the invention are directed to a generic method and a generic device, wherein a more robust, i.e., more reliable, selection and activation of input fields and input content is made possible.

The invention is based on the knowledge that, populating a generic input area with two input options: firstly, inputting a gesture for the selection of the respective input area, and secondly, actuating a switching function (in particular by actuating a mechanical switch connected to the input area) by exerting a corresponding force on the input area for the activation of a function stored for this input area, leads to the following problem.

The respective input area is preferably selected by means of a cursor displayed on the screen, the position of which cursor displayed on the screen changes based on the gesture input and therefore the cursor can be placed on an input field to be selected. By exerting a force on the input field (performing the switching function), the input content which is stored for the input field selected by means of the cursor is activated.

When the switching function is actuated by exerting an appropriate input force on the input area by means of a user's finger, this finger deforms, which in turn leads to a change in the shape of the finger contact area on the input area and is correspondingly detected. This change in the finger contact area generally shifts the detected center of gravity of the finger and can therefore be interpreted as a changed input position of a gesture input. By changing the input position in this way, in the event of a sole actuation of the switching function, a finger movement can be erroneously recognized, a gesture input can be assumed and the cursor can be moved. This can lead to operating errors.

By way of example, a driver of a vehicle has selected an option in a menu displayed on a screen by positioning a cursor (for example in a list) and would like to activate this option. By rolling the finger on the input area of an input interface, also present in the vehicle, the input is erroneously interpreted as a gesture input before the switching function has been executed due to the detected, changed finger contact area. If this input interpreted as a gesture input leads to a changed and unintentional selection of a menu option directly before the electrical switching function has been triggered (due to a correspondingly changed cursor position), the wrong option from the menu is activated when the switching function is triggered. Upon removing the finger from the input area, the finger contact area changes again (usually in the opposite direction), so that the cursor jumps back to its original position.

From the operator's point of view, a simple input to trigger the switching function thus leads to a wrong input field being initially selected and activated before the cursor jumps back to the originally intended input field, without having activated the latter, however.

The invention is aimed in particular at minimizing such problems. The invention is apparent from the features of the independent claims. Advantageous refinements and configurations are the subject matter of the dependent claims.

A first aspect of the invention relates to a method for selecting input fields displayed on a screen and/or for activating input content displayed in a selected input field on the screen by means of manual inputs into an input area of an input interface, wherein the input interface is designed for the haptic input of gestures into the input area, in order to control the selection of an input field, and for the activation of input content of a selected input field by triggering an electrical switching function of the input interface by means of exerting a predefined minimum force on the input area. The method comprises the following steps.

In one step, a displacement vector $V(POS(t_1),POS(t_2))$ is ascertained from ascertained input positions $POS(t_1)$, $POS(t_2)$ of a manual, continuous input of gestures into the input area at a first point in time $t_1$ and a second point in time $t_2$, where t:=time and $t_1<t_2$.

In a further step, an absolute value $|F(t)|$ of a surface area $F(t)$, with which the manual gesture input acts on the input area, is ascertained.

In a further step, provided that: $|F(t_2)|<|F(t)|$, the input field which is adjacent, at least closest to a position $POS_{SCREEN}(POS(t_1))$ associated with the position $POS(t_1)$ on the screen as seen in the direction of the displacement vector $V(POS(t_1),POS(t_2))$ is selected. An adjacent input field can comprise the input field directly adjoining the position $POS(t_1)$, i.e., the closest input field; depending on the length of the displacement vector $V(POS(t_1),POS(t_2))$, the adjacent input field can also comprise the next-but-one input field or even an input field that is further away in the displacement direction. Provided that $(|F(t_2)|>|F(t_1)|)$, the displacement vector $V(POS(t_1),POS(t_2))$ is disregarded and the function associated with the position $POS(t_1))$ is activated.

The method is advantageously executed iteratively using predefined time intervals i. In other words, the time t does not elapse continuously, but in predefined increments of time $\Delta t$. The execution of a time interval thereby results in i→i+1: $t_{i+1}=t_i+\Delta t$.

The term "screen" is understood in the present context to mean by way of example an LCD, LED, OLED, or plasma screen, which is advantageously designed to display alphanumeric and graphical elements, in particular input fields, in which input content is displayed. The screen is advantageously part of a vehicle system, in particular of a navigation system, of an entertainment system, of an infotainment system or of an air-conditioning system.

The term "input field" is understood in the present context to mean an advantageously visually "highlighted" surface area on the screen that has "input content" assigned to it, wherein an associated function is executed when the relevant input field or its input content is selected and activated. The visual "highlighting" is created, for example, by a noticeable coloring of the input fields. By way of example, various radio stations are displayed on a screen in rows. In this case, one row corresponds to one input field in a list. By selecting such an input field, or respectively a row, and activating the associated input content, respectively the associated radio station, this radio station is by way of example selected and can be listened to. The activation is brought about by exerting a minimum input force on the input area. One or more input fields can be displayed on the screen, the input fields themselves being able to have the same or different shapes. The functions brought about by selecting an input field and activating its input content can be correspondingly selected depending on the task.

The term "input area" is understood in the present context to mean a touch-sensitive surface of a corresponding touch-sensitive sensor. Such touch-sensitive sensors advantageously comprise a plurality of resistive sensor elements or a plurality of capacitive sensor elements or a mixture of resistive and capacitive sensor elements. The input area thus serves to detect haptic or manual gesture inputs. The sensor elements advantageously form a sensor array that enables input positions of the gesture input on an input area to be evaluated. A user typically makes such gesture inputs using their finger. The input area is therefore advantageously correspondingly sized so that gesture inputs are feasible using a finger. Advantageously, the input area is not identical to the screen or a part of the screen, so that the input area can be arranged at an ergonomically optimized position, independent of the screen. Advantageously, the input area of the input interface is arranged in the region of a vehicle cockpit, in particular on a joystick, on a steering wheel or on a gear selector, on a center console, on a display panel.

The term "input interface" is advantageously understood in the present context to mean the input area, an associated touch-sensitive sensor array and also a mechanical switch that is coupled to the input area and executes an electrical switching function by exerting a minimum force on the input area (when a force is exerted that is smaller than the minimum force, the electrical switching function is accordingly not executed).

The input area is advantageously the input area of a capacitive surface sensor that has a plurality of capacitive sensor elements (capacitive sensor array), which are used to ascertain the area $F(t)$ and thus also the absolute value $|F(t)|$. In the present case, the absolute value $|F(t)|$ corresponds to the surface area of the area $F(t)$ with which the manual gesture input acts on the input area. Gesture inputs can already be detected by near-field action using such a capacitive surface sensor if, for example, a user's finger is not yet mechanically touching the input area.

The current input position $POS(t)$ at the time t is advantageously determined as the center of gravity or center of the currently detected surface area $F(t)$.

If a gesture is continuously input into the input area from the first point in time $t_1$ up to the second point in time $t_2$, the displacement vector $V(POS(t_1),POS(t_2))$ is ascertained from the ascertained input positions $POS(t_1)$ and $POS(t_2)$. The displacement vector $V(POS(t_1),POS(t_2))$ is correspondingly defined by direction and length. The second point in time $t_2$ advantageously corresponds to the current time t. The first point in time $t_1$ advantageously corresponds to the time at which the current gesture input began.

In a further step, provided that: $|F(t_2)|<|F(t_1)|$, the input field which is adjacent or at least closest to a position $POS_{SCREEN}(POS(t_1))$ associated with the position $POS(t_1)$ on the screen as seen in the direction of the displacement vector $V(POS(t_1),POS(t_2))$ is selected. Advantageously, only the ascertained direction of the displacement vector $V(POS(t_1),POS(t_2))$ is relevant for this purpose. In one embodiment, when the adjacent or at least closest input field is selected, both the ascertained direction and the ascertained length of the displacement vector $V(POS(t_1),POS(t_2))$ are taken into account and the function associated with the position $POS_{SCREEN}(POS(t_2))$ on the screen is triggered.

Using the proposed method, the selection of an input area can be made more robust on the basis of the temporal change to the absolute value $|F(t)|$ of the surface area of the area $F(t)$, in particular erroneous triggering caused by changes to a finger contact area during the gesture input can be avoided. An ascertained displacement vector $V(POS(t_1),POS(t_2))$ is taken into account or disregarded as a function of the change of $|F(t)|$ during the selection of an input field. In the case $(|F(t_2)|<|F(t_1)|)$, the selection of an input field on the screen is changed in accordance with the direction and/or path of the displacement vector $V(POS(t_1),POS(t_2))$. In the other case $(|F(t_2)|>|F(t_1)|)$, when the displacement vector $V(POS(t_1),POS(t_2))$ is disregarded, the selection, existing at the time $t_1$, of an input field is not changed. In other words, if $(|F(t_2)|>|F(t_1)|)$, the displacement vector $V(POS(t_1),POS(t_2))$ is disregarded and the input field associated with the position $POS(t_1)$ remains selected on the screen. By pressing the electrical switching function that is triggered on the input field, the function associated with the position $POS_{SCREEN}(POS(t_1))$ is activated at the point in time $t_2$. In the rare event that $(|F(t_2)|=|F(t_1)|)$ exactly, the selection of an input field on the screen can alternatively be changed or disregarded as described above in accordance with the displacement vector $V(POS(t_1),POS(t_2))$ depending on the geometric arrangement of the input areas in relation to the user.

One advantageous refinement of the proposed method is characterized in that if, starting from the first point in time $t_1$, the absolute value $|F(t)|$ is increased for a predefined time duration $\Delta t_{MAX}$, the displacement vector $V(POS(t_1),POS(t_2))$ is ascertained for the second point in time $t_2=t_1+\Delta t_{MAX}$ defined as the end of the time duration $\Delta t_{MAX}$ and the input field closest to a position $POS_{SCREEN}(POS(t_1))$ associated with the position $POS(t_1)$ on the screen as seen in the direction of the displacement vector $V(POS(t_1),POS(t_2))$ is selected. This refinement takes erroneous interpretations into account, in particular when gesture inputs are executed slowly. When gesture inputs are executed slowly, the result, by way of example, is that the absolute value $|F(t)|$ rises for about 300-600 ms, in particular for 500 ms, before it starts to fall again. This time response is typical of slowly executed gesture inputs and rather untypical of executing an input for merely executing the switching function. Therefore, in order not to unnecessarily delay a slowly executed gesture input, the time duration $\Delta t_{MAX}$ is predefined which is selected such that most inputs for performing the switching function are intercepted and slowly executed gesture inputs are detected.

One advantageous refinement of the proposed method is characterized in that the input field closest to the position $POS_{SCREEN}(POS(t_1))$ as seen on the screen is only selected if a force profile $K(t)$ acting on the input area during the gesture input in the time period $t_1$ to $t_2$ in each case has gradients grad (K(t)) below a predefined gradient GRAD: grad (K(t))<GRADK. In this method, a force profile K(t) acting on the input area is thus detected using an appropriate force sensor. The background to this refinement is that, when the input to perform the switching function begins, the force signal begins to increase significantly before saturation of the absolute value |F(t)|. This refinement likewise takes erroneous interpretations into account in particular when gesture inputs are executed slowly.

One advantageous refinement of the proposed method is characterized in that if, after the first point in time $t_1$, the absolute value |F(t)| increases until the electrical switching function is triggered, the input field selected on the screen at the first point in time $t_1$ is selected with the triggering of the switching function and the input content of this input field is activated. In this refinement, the displacement vector V(POS$(t_1)$,POS$(t_2)$) is disregarded and thus the originally (at point in time $t_1$) selected input field is retained and its input content is activated upon triggering the switching function.

One advantageous refinement of the proposed method is characterized in that, in the case that: |F$(t_2)$|<|F$(t_1)$|, the input field closest to a position POS$_{SCREEN}$(POS$(t_1)$) associated with the position POS$(t_1)$ on the screen as seen in the direction of the displacement vector V(POS$(t_1)$,POS$(t_2)$) is selected and the input content of this input field is activated upon triggering the switching function at the point in time $t_2$. In this refinement, an input field corresponding to the displacement vector V(POS$(t_1)$,POS$(t_2)$) is selected and the input content of this input field is activated upon triggering the switching function.

One advantageous refinement of the proposed method is characterized in that displacement vectors V(POS$(t_1)$,POS$(t_2)$) ascertained after triggering the switching function for a predefined period of time $\Delta t_{SWITCH}$ for the selection of an input field are disregarded. This has the result that after triggering the switching function, the input field selected at this point in time does not change.

One advantageous refinement of the proposed method is characterized in that an input field is only selected and/or an input content of a selected input field is only activated provided that the absolute value |V(POS$(t_1)$,POS$(t_2)$)| of the displacement vector V(POS$(t_1)$,POS$(t_2)$) exceeds a predefined limit value. In this refinement, in particular, unintentional inputting of gestures into the input field is disregarded.

One advantageous refinement of the proposed method is characterized in that an input field is selected and/or an input content of a selected input field is activated on condition that |F$(t_2)$|<|F$(t_1)$| only for one or more predefined directions of the displacement vector V(POS$(t_1)$, POS$(t_2)$). It is assumed here that the area signal decreases towards the end of an intentional finger movement. However, this preferably only occurs in certain directions when operating a touch-operated input field, in particular on a thumb-operated input field that is arranged on a steering wheel in the event of a swiping movement from top to bottom or in the direction of the center of the steering wheel.

Advantageously, an increase or a decrease in the absolute value |F(t)| of the surface area F(t) is detected/evaluated in each case in predefined tolerance time ranges. This ensures that changes to the absolute value of |F(t)| are only taken into account in the method from a predefined differential absolute value onwards.

A further aspect of the invention relates to a device for selecting input fields displayed on a screen and/or for activating input content displayed in a selected input field on the screen by means of manual inputs into an input area of an input interface, wherein the input interface is designed and configured for the haptic input of gestures into the input area, in order to control the selection of an input field, and for the activation of input content of a selected in-put field by triggering an electrical switching function of the input interface by means of exerting a predefined minimum force on the input area, comprising: an evaluation means which is designed and configured to ascertain a displacement vector V(POS$(t_1)$,POS$(t_2)$) from ascertained input positions POS$(t_1)$,POS$(t_2)$ of a manual continuous input of gestures into the input area at a first point in time $t_1$ and a second point in time $t_2$, where t:=time and $t_1<t_2$; and furthermore to ascertain an absolute value |F(t)| of a surface area F(t), with which the manual gesture input acts on the input area, and a control means which is designed and configured for one or more predefined directions of the displacement vector V(POS$(t_1)$, POS$(t_2)$) in such a way that, provided that: |F$(t_2)$|<|F$(t_1)$|, the input field which is closest to a position POS$_{SCREEN}$(POS$(t_1)$) associated with the position POS$(t_1)$ on the screen as seen in the direction of the displacement vector V(POS$(t_1)$,POS$(t_2)$) is selected and provided that (|F$(t_2)$|>|F$(t_1)$|), the displacement vector V(POS$(t_1)$,POS$(t_2)$) is disregarded and the function associated with the position POS$(t_1)$ is effected.

The control means is designed and configured in this case such that an input field is selected and/or an input content of a selected input field is activated only for one or more predefined directions of the displacement vector V(POS$(t_1)$, POS$(t_2)$).

One advantageous refinement of the proposed device is characterized in that the evaluation means is designed and configured such that if, starting from the first point in time $t_1$, the absolute value |F(t)| is increased for a predefined time duration $\Delta t_{MAX}$, the displacement vector V(POS$(t_1)$,POS$(t_2)$) is ascertained at the second point in time $t_2=t_1+\Delta t_{MAX}$ defined as the end of the time duration $\Delta t_{MAX}$, and the control means is designed and configured such that the input field which is the closest on the screen in the direction of the displacement vector V(POS$(t_1)$,POS$(t_2)$) at the first point in time $t_1$ is selected.

One advantageous refinement of the proposed device is characterized in that the input interface has a force sensor for detecting a force K(t) exerted on the input area, and the control means is designed and configured such that the input field which is closest to the position POS$_{SCREEN}$(POS$(t_1)$) as seen on the screen is selected if a force profile K(t) acting on the input area during the gesture input in the time period $t_1$ to $t_2$ in each case has gradients grad (K(t)) below a predefined gradient GRAD: grad (K(t))<GRADK.

One advantageous refinement of the proposed device is characterized in that the input area is the input area of a capacitive surface sensor which has a plurality of capacitive sensor elements which are used to ascertain the absolute value |F(t)|.

One advantageous refinement of the proposed device is characterized in that the evaluation means is designed and configured such that the input positions POS(t) are determined as the center of gravity or center of the surface area F(t).

One advantageous refinement of the proposed device is characterized in that the control means is designed and configured such that if, after the first point in time $t_1$, the absolute value |F(t)| increases until the electrical switching function is triggered, the input field selected on the screen at the first point in time $t_1$ is selected with the triggering of the switching function and the input content of this input field is activated.

One advantageous refinement of the proposed device is characterized in that the control means is designed and configured such that in the case that: $|F(t_2)|<|F(t_1)|$, the input field closest to a position $POS_{SCREEN}(POS(t_1))$ associated with the position $POS(t_1)$ on the screen as seen in the direction of the displacement vector $V(POS(t_1),POS(t_2))$ is selected and the input content of this input field is activated upon triggering the switching function at the point in time $t_2$.

One advantageous refinement of the proposed device is characterized in that the control means is designed and configured such that displacement vectors $V(POS(t_1),POS(t_2))$ ascertained after triggering the switching function for a predefined period of time $\Delta t_{SWITCH}$ for the selection of an input field are disregarded.

One advantageous refinement of the proposed device is characterized in that the control means is designed and configured such that an input field is only selected and/or an input content of a selected input field is only activated provided that the absolute value $|V(POS(t_1),POS(t_2))|$ of the displacement vector $V(POS(t_1),POS(t_2))$ exceeds a predefined limit value.

One advantageous refinement of the proposed device is characterized in that the control means is designed and configured in this case such that an input field is selected and/or an input content of a selected input field is activated only for one or more predefined directions of the displacement vector $V(POS(t_1), POS(t_2))$.

One advantageous refinement of the proposed device is characterized in that the evaluation means is designed and configured such that an increase or a decrease in the absolute value $|F(t)|$ of the surface area $F(t)$ is detected/evaluated in each case in predefined tolerance time ranges.

One advantageous refinement of the proposed device is characterized in that the screen is part of a vehicle system, in particular of a navigation system, an entertainment system, an infotainment system, an air-conditioning system.

One advantageous refinement of the proposed device is characterized in that the input area of the input interface is arranged in the region of a vehicle cockpit, in particular on a joystick, on a steering wheel or on a gear selector, on a center console, on a display panel.

A further aspect of the present invention relates to a vehicle, in particular a motor vehicle, an electric vehicle, an aircraft, a rail vehicle, a watercraft having a device as described above.

Further advantages, characteristics and details will become apparent from the following description in which— if appropriate with reference to the drawings—at least one exemplary embodiment is described in detail. Identical, similar and/or functionally identical parts are provided with the same reference signs.

BRIEF DESCRIPTION OF THE DRAWING FIGURES

Figure 1B:
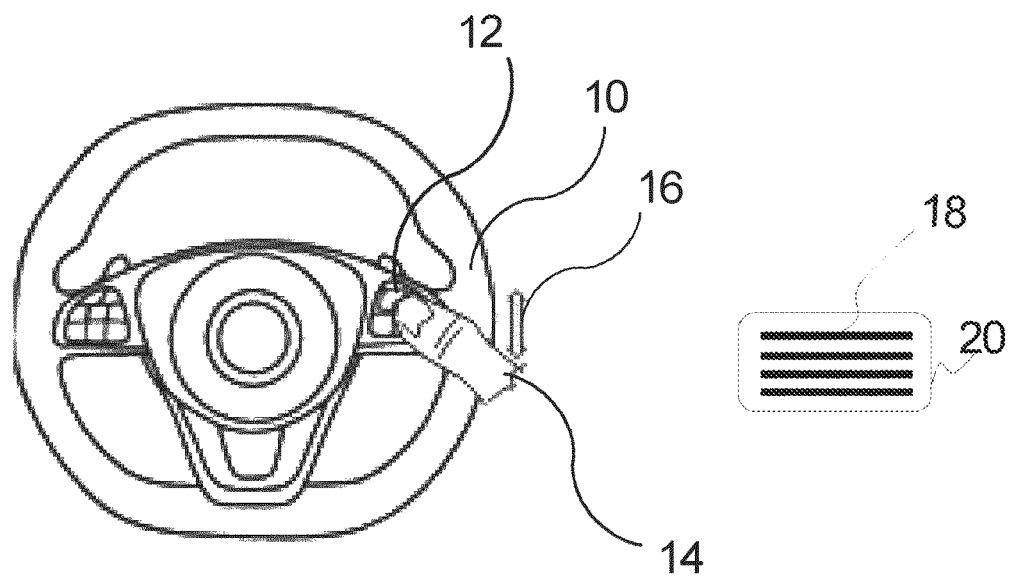
Figure 2:
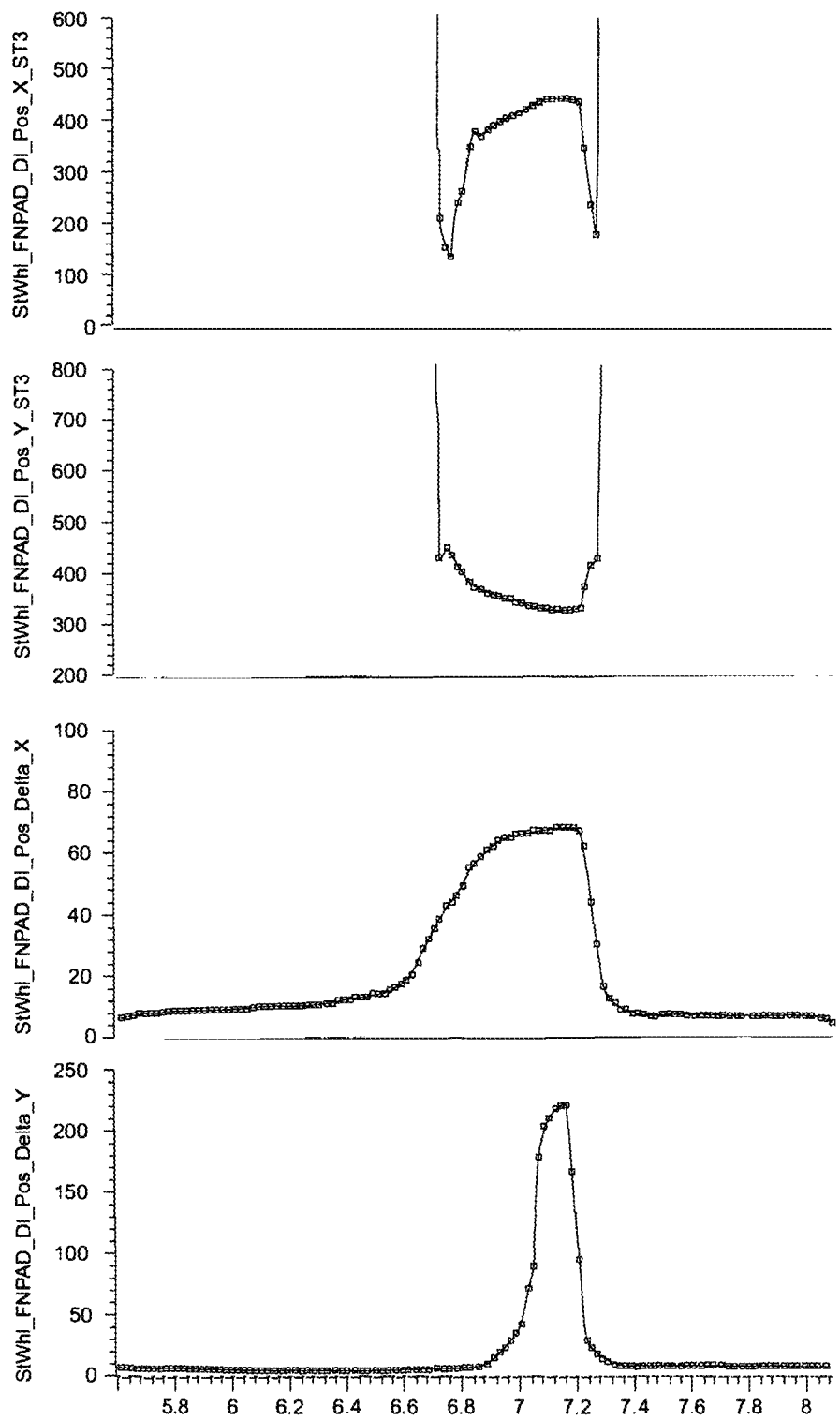
Figure 3:
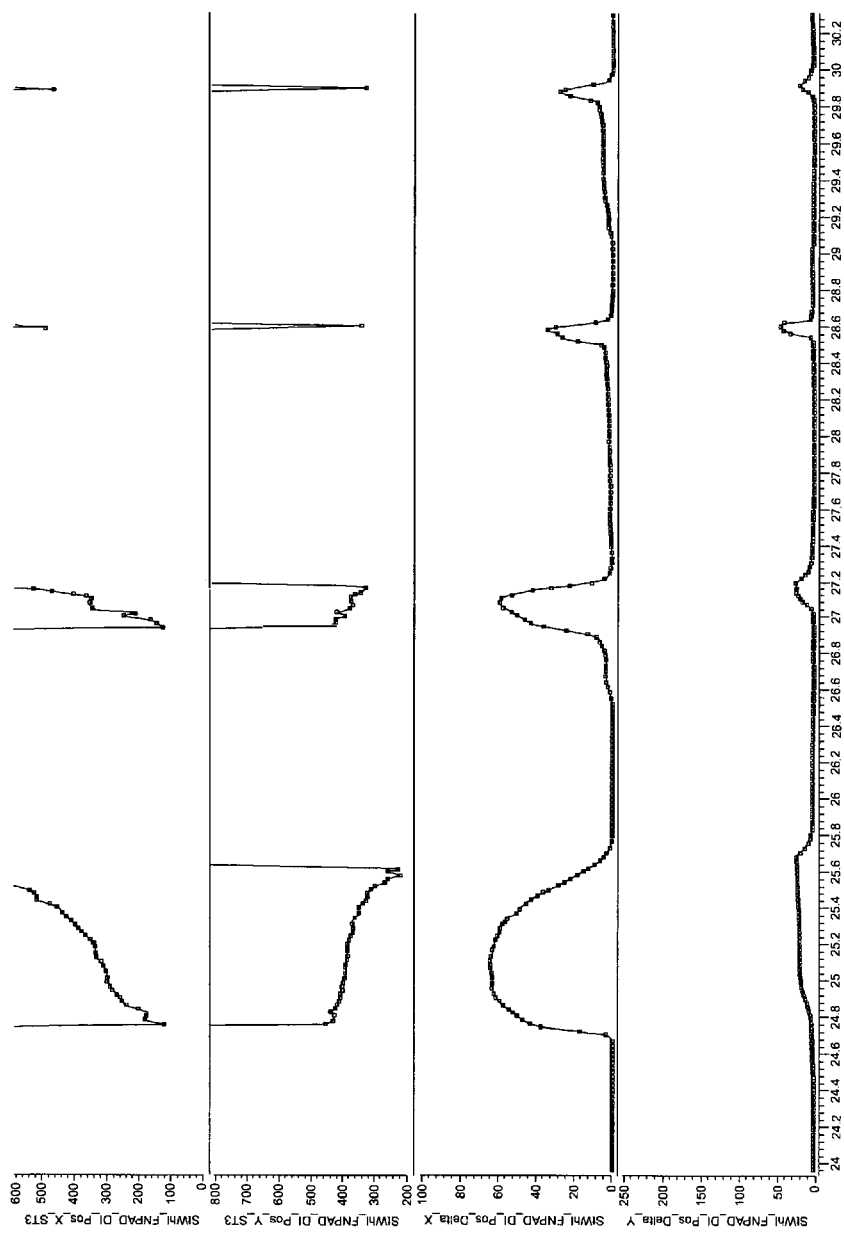
Figure 4:
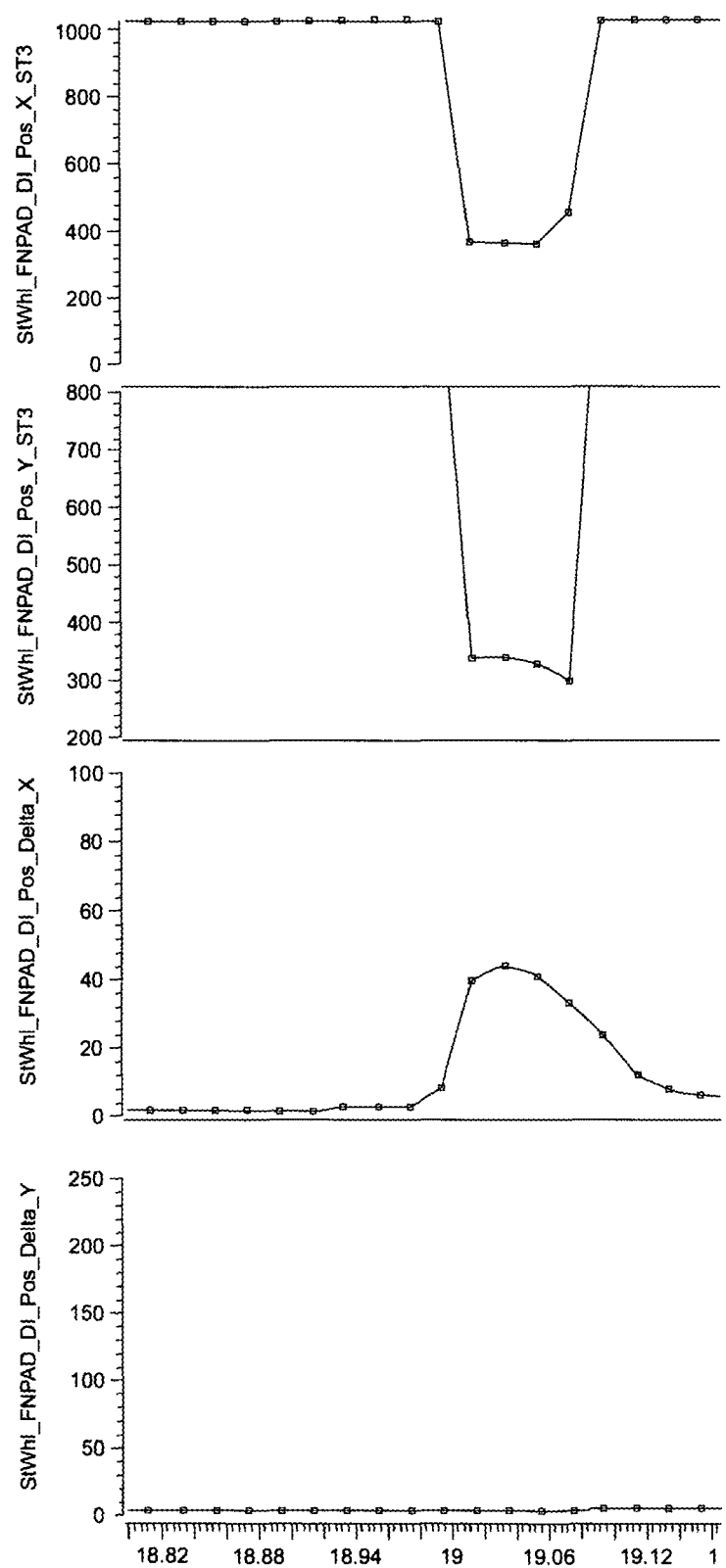
Figure 5:
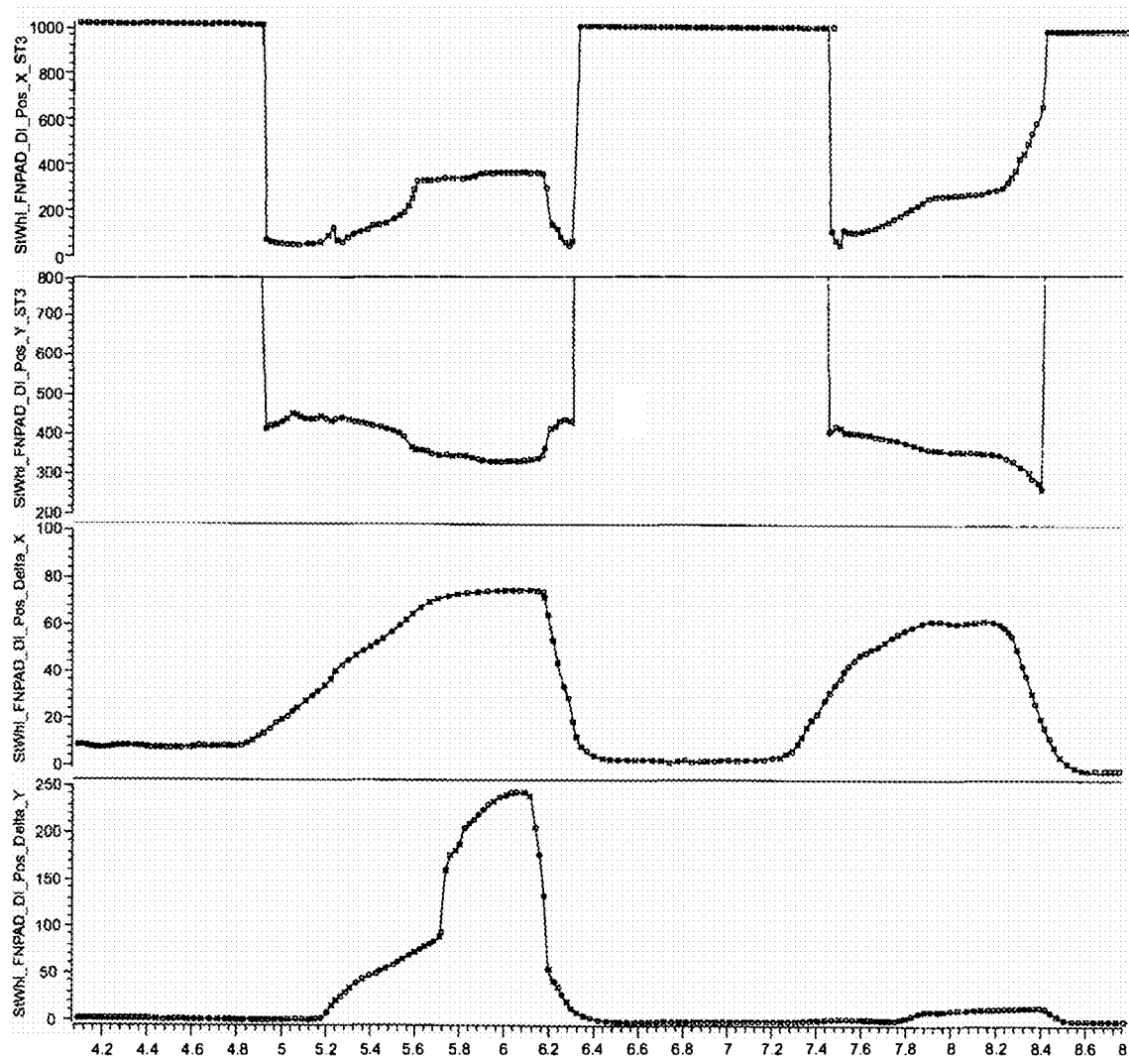
Figure 6:
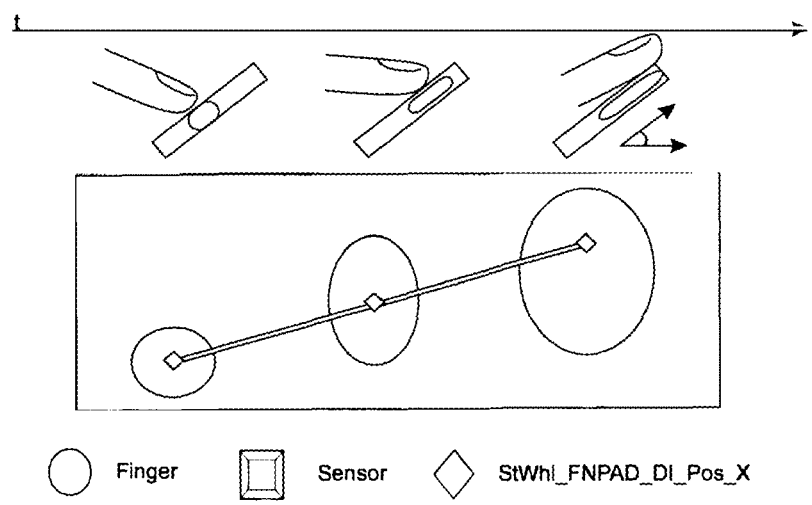
Figure 7:
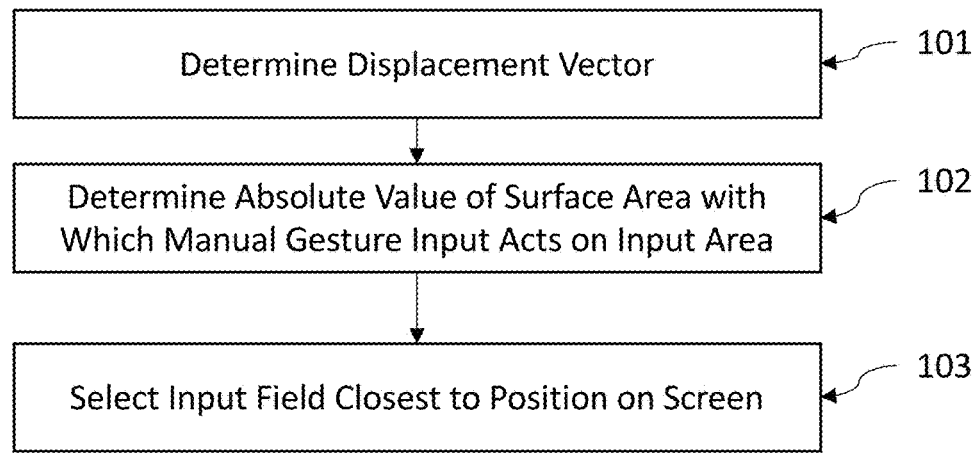
Figure 8:
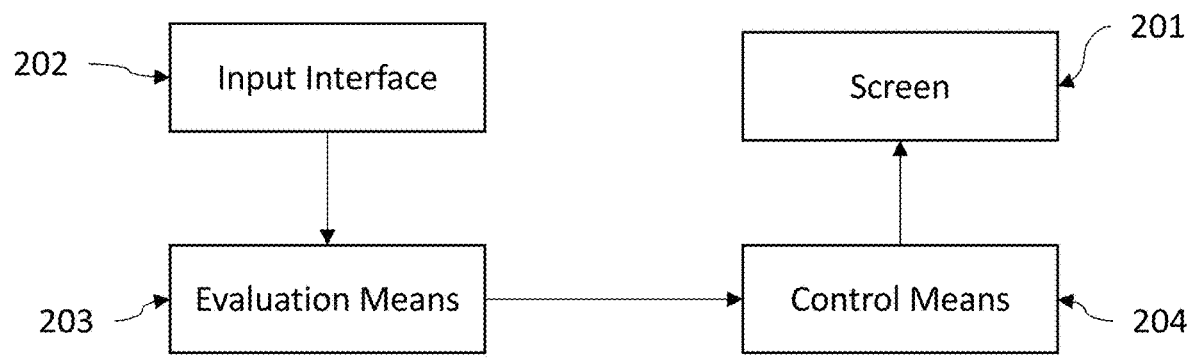

In the drawings:

FIG. 1A shows the effect of a rolling finger on the calculated center of gravity coordinate, FIG. 1B shows a steering wheel with an inventive device, FIG. 2 shows sensor data of a typical input for triggering the switching function (without gesture input), FIG. 3 shows sensor data for four valid swipes without triggering the switching function with a gesture input speed that increases from left to right, FIG. 4 shows sensor data of a single, quick user input, FIG. 5 shows a comparison of sensor data for a slow keystroke and a slow swipe, FIG. 6 shows an ergonomically caused monotonic increase in the finger contact area when moving the finger upwards on the input area, FIG. 7 shows a highly schematized flow chart of an inventive method, and FIG. 8 shows a highly schematized design of an inventive device.

DETAILED DESCRIPTION

The invention will be explained once more in detail below with the aid of an exemplary embodiment. In this exemplary embodiment, the input interface is arranged on a steering wheel of a vehicle, in particular of a car, electric vehicle or truck.

The input interface detects user inputs on the vehicle steering wheel. The input interface comprises an input area for detecting gesture inputs (hereinafter called "FNPad"). The input interface is furthermore designed to trigger an electrical switching function by exerting a minimum force on the input area. To detect the gesture inputs, the input interface has an array with a multiplicity of capacitive sensor elements on the input area. The input area is furthermore connected to a mechanically operable electrical switch, the switching function of which is executed by exerting the minimum force in the input area.

Using the FNPad, the user can operate telematics components (such as, e.g., instrument cluster, head unit, etc. in the vehicle) by means of gesture inputs, i.e., in particular "swiping gestures" in the "up", "down", "right", "left" directions. The gesture inputs are also referred to below as "swipe". The FNPad additionally affords the user the possibility of mechanically actuating an electrical switch by exerting a minimum force on the input area and thus of triggering a switching function (called "OK-press" hereinafter). In the telematics components, this input is usually interpreted as a keystroke or confirmation.

By allocating two input options ("swipe" and "OK-press") to the same input area, the following problem arises.

Upon actuating the switching function (OK-press), the input force results in the deformation of the finger's contact area, i.e., in particular in an increase in size of the finger contact area on the input area of the FNPad. The change in the finger contact area shifts the detected finger center of gravity and thus a calculated finger position (illustrated as tuples (x,y) in a Cartesian coordinate system).

This change in the calculated finger position causes the telematics components to erroneously detect a finger movement. Depending on the amount and direction of this supposed movement, swipes not intended by the user can be detected.

FIG. 1A illustrates a worst-case scenario of this operating error.
1) The user has selected an option from a telematics components menu displayed on the screen by positioning a cursor (e.g., in a list) on an input field and would like to confirm this selection by triggering the switching function. To do this, they actuate the FNPad with their finger in order to apply the appropriate minimum force to trigger the switching function.
2) However, rolling the finger over the FNPad is erroneously detected and treated as a swipe, resulting in an unintentional change to the cursor position on the screen prior to the switching function being triggered, as a result of which the cursor is positioned on the next closest list element/input field.

3) If this supposed swipe is detected and executed immediately prior to the switching function being triggered, the user has no more time to react and triggers "OK-press". However, rather than the intended list element, the user unintentionally confirms the next closest list element.

4) When the finger is lifted up, the force applied to the FNPad decreases and thereby causes the finger contact area to change again. Thus, a change to the input position of the finger is detected again, usually in a direction opposite to in 2), this change being interpreted and implemented as a swipe, as a result of which the cursor is placed back on the originally (1)) selected list element/input field.

From the user's point of view, a simple input to trigger the switching function (comparable to a keystroke) thus leads to a wrong input field being initially selected and the input content thereof being activated before the cursor jumps back during this same input process to the originally intended input field, without confirming the latter, however.

In the exemplary embodiment, the FNPad is realized with an input area of a capacitive sensor array. The sensor array transmits a new Cartesian coordinate tuple (x,y) every 20 ms. An application (called "gesture recognizer" hereinafter) which ascertains displacement vectors $V(POS(t_1), POS(t_2))$ from the differences of successive coordinate tuples (x,y) is realized in the input interface and, using various filter algorithms, converts these vectors into swipes and executes them, thereby controlling a cursor position on the screen.

One possibility is to stop the calculation of swipes in the gesture recognizer as soon as the switching function is triggered. Since, however, the deformation of the finger and thus the change in the calculated finger position already begins well before the switching function is triggered (order of magnitude 200 ms), this mechanism alone is not capable of avoiding the above-described problem.

Although introducing a (static or codable) waiting time could prevent unintentional swipes from being executed, this would cause an additional delay between the operating action and the reaction of the system, which would be extremely noticeable to the user. The consequence would be an unacceptable reduction in the perceived value of the overall system (i.e., the reaction of the system would be perceived as too slow/delayed).

Any solution must therefore be suitable for:
reliably preventing unintentional swipes,
not noticeably delaying intentional swipes.

Two solutions (A and B) are presented below. For both solutions, in addition to the coordinate tuple (x,y), the capacitive sensor (sensor array) must output further information.

Overview of Solution A

Summed raw data of the sensor array are additionally output, i.e., essentially, the summed raw data of the individual rows and columns of the capacitive sensor array. This solution can advantageously be realized without additional hardware. However, solution A is less robust, since it can suppress valid, i.e., intentional swipes, during slow gesture input.

Overview of Solution B

In addition to A), a force K(t) exerted on the input area is detected and evaluated. For this purpose, on the one hand, at least one force sensor connected to the input area is required; on the other hand, taking into account the force K(t) exerted on the input area allows a more robust recognition and consideration, in particular of slowly input swipes.

The following shows how this new information can be used to recognize an incipient "OK-press" in the gesture recognizer. For this purpose, various recordings of exemplary sensor data are shown. The following signals are defined for this:

StWhl_FNPAD_DI_Pos_X_ST3: X coordinate of the center of gravity of the finger (value range: 0-1023)

StWhl_FNPAD_DI_Pos_Y_ST3: Y coordinate of the center of gravity of the finger (value range: 0-1023)

StWhl_FNPAD_DI_Pos_Delta_X: summed raw data of the sensor array (herein-after called "area signal"). Assumption: There is an approximately monotonically increasing relationship between the area signal and the real finger contact area on the input area.

StWhl_FNPAD_DI_Pos_Delta_Y: Measured value of the force sensor, hereinafter called "force signal". Here too, a monotonic relationship between force applied and sensor measured value is assumed.

The aim of the evaluation is thus to recognize in a user input the signs of an incipient input to trigger the switching function (or more simply: an incipient keystroke to trigger the switching function). For this purpose, a Boolean value is advantageously defined ("SuppressGesturePositionEnd"), which, in the case of "TRUE", suppresses the output of detected swipes to the screen. It is assumed here that even for intentional swipes, this Boolean value can be "TRUE" at least sometimes.

It is therefore important not to simply disregard recognized swipes. Instead, advantageously, recognized swipes are only retained and temporarily stored in a memory unit.

If the Boolean value jumps from "TRUE" to "FALSE" while the user input is still ongoing, the retained swipes are output to the screen as valid input.

If the value of SuppressGesturePositionEnd remains at "TRUE" until the user input has ended (generally, by triggering the switching function), retained/temporarily stored swipes are disregarded or deleted for good or subsequently overwritten.

FIG. 1B shows an exemplary steering wheel 10 with an inventive device comprising an input field 12, which can be operated by swiping operations 16 using a finger 14 of a hand that is controlling the steering wheel. Input content of an input field 18 on a screen 20 can be selected via the swiping movements 16. During the swiping movement of the finger 14, rolling of the finger due to tilting cannot be avoided, thus resulting in the unintentional triggering of functions in the description with reference to FIG. 1A.

FIG. 2 shows sensor data of a typical input for triggering the switching function (without gesture input). It can clearly be seen that already by approaching the sensor surface (input area) with the finger, the area signal (third sensor signal from the top) increases even before the output of the first valid coordinate tuple (x,y) (first and second sensor signal from the top) and then continues to increase for most of the input due to the rolling of the finger.

It can also be seen that most of the change in coordinates has already taken place before the force signal (fourth sensor signal from the top) starts to rise. In general, this change in coordinates can already be erroneously interpreted and implemented as a swipe. Therefore, the force signal (alone) is not suitable for recognizing an incipient input to trigger the switching function.

Furthermore, a change in coordinates can clearly be seen when the finger is lifted off. As expected, this change in coordinates is accompanied by a steeply falling edge in the force signal and area signal.

Solution Approach A—Simple Solution

FIG. 3 shows sensor data (from top to bottom: StWhI_FNPAD_DI_Pos_X_ST3, StWhI_FNPA_DI_Pos_Y_ST3, StWhI_FNPAD_DI_Pos_Delta_X, StWhI_FNPAD_DI_Pos_Delta_Y) for four valid, intentional swipes at different gesture input speeds. The gesture input speed increases from left to right here. In all the swipes it is noticeable that the respective sensor signal starts to fall from about the middle of the user input onwards, whereas in FIG. 2 it rises monotonically over the entire duration of the operation until the point in time at which the switching function is triggered. Since, from this point in time onwards, swipes are advantageously disregarded anyway, the rise in the area signal appears to be a sufficient criterion for SuppressGesturePositionEnd="TRUE". A falling area signal appears to be a sufficient criterion for SuppressGesturePositionEnd="FALSE".

In the first and slowest swiping movement (far left) in FIG. 3, it is noticeable that the area signal rises for about 500 ms before starting to fall. This behavior is typical of slow swipes and rather untypical of inputs to trigger the switching function. So as not to unnecessarily delay a slowly executed swipe, a maximum duration for SuppressGesturePositionEnd="TRUE" is advantageously defined, which is sufficient to intercept most inputs to trigger the switching function and to allow slow gesture inputs. At this point, it is initially accepted that this may result in some "false positives" and "false negatives" in the threshold area. An even more robust determination of SuppressGesturePositionEnd is described below under solution B.

It is also noticeable that although the area signal rises monotonically here, it does not rise strictly monotonically. In general, signal noise can even cause a short-term drop within the rising edge. Therefore, a temporal tolerance range is advantageously defined, in which a rise in a respective signal is detected.

However, if this tolerance range is set too large, individual, fast inputs can be erroneously disregarded. FIG. 4 shows sensor data for a quickly executed input that consists of only four coordinate tuples (x,y). The largest displacement vector $V(POS(t_1), POS(t_2))$, which also causes a swipe here, is ascertained by the last two coordinate tuples: POS $(t_1)$, POS$(t_2)$. At this point in time, the area signal has only been falling for 2 signal cycles. If the tolerance range was defined here with 3 or more cycles, the value for SuppressGesturePositionEnd during the entire user input would be "TRUE" and the intentional, actually valid swipe would be disregarded. As a result, the user would not notice any reaction to their input and would perceive the gesture input system as unreliable.

Finally, the time period after the triggering of the switching function and the subsequent lifting off of the finger from the input area must also be considered. The point in time at which the switching function is triggered can be determined accurately by a Boolean input signal of the gesture recognizer (Mechanical Button Status: "TRUE"=pressed, "FALSE"=released) and does not have to be determined via detours and auxiliary signals. It suffices here to discard all swipes detected within a time duration to be defined following the triggering of the switching function. The time duration should be selected such that unintentional gesture inputs are intercepted but intentional gesture inputs are not suppressed or disregarded. This time period is advantageously of the order of magnitude of 100-300 ms, in particular 200 ms.

The result of these considerations is the following algorithm for calculating SuppressGesturePositionEnd, which is run through upon each new signal cycle or time interval:

int D_OKpress_Detection_Sensitivity
int D_Max_Suspend_Cycles
int D_OKpress_DeadTime Consider the time period of the last D_OKpress_Detection_Sensitivity values of the area signal.

If the area signal has risen at least once within this time period, set SuppressGesturePositionEnd="TRUE", otherwise set SuppressGesturePositionEnd="FALSE"

If at least D_Max_Suspend_Cycles signal cycles have elapsed since the first (based on a current gesture input) setting* of SuppressGesturePositionEnd="TRUE", set SuppressGesturePositionEnd="FALSE"

If the switching function was triggered within the last D_OKpress_DeadTime signal cycles, disregard and delete all detected swipes Here:
D_OKpress_Detection_Sensitivity:=number of elapsed signal cycles which were used for the consideration. The higher this value, the more sensitive the filter, but also the higher the rate of false positives.

D_Max_Suspend_Cycles:=maximum number of signal cycles/time intervals i, for which SuppressGesturePositionEnd can be kept at the value "FALSE".

D_OKpress_DeadTime:=number of signal cycles/time intervals i, for which the outputting of swipes is suppressed following triggering of the switching function.

*Alternative variant: If since the last (based on a current gesture input) setting of SuppressGesturePositionEnd="TRUE" . . . This preferably re-starts a timer in the case of fluctuations in the area signal, among other things.

As already mentioned above, when selecting the time window D_Max_Suspend_Cycles, it is advantageous to consider the following:

If the time window is too long, slow swipes are delayed considerably. As a result, the user perceives the entire system to be sluggish and inefficient.

If the time window is too short, slow inputs, i.e., keystrokes and/or swipes, cannot be detected. As a result, the erroneous operation mentioned at the beginning persists and the user perceives the entire system to be unreliable.

FIG. 5 illustrates this problem. To this end, FIG. 5 shows sensor data (from top to bottom: StWhI_FNPAD_DI_Pos_X_ST3, StWhI_FNPAD_DI_Pos_Y_ST3, StWhI_FNPAD_DI_Pos_Delta_X, StWhI_FNPAD_DI_Pos_Delta_Y) for a slow triggering of the switching function (left event respectively) followed by a slow gesture input/swipe input (right event respectively). Both cases are valid and real-life operating images. In both cases, it takes considerably more than 600 ms for the area signal to stop rising.

Solution Approach B—Including A Force Sensor

It can be seen in FIG. 5 that the force signal StWhI_FNPAD_DI_Pos_Delta_Y (=K(t)) starts to rise well before the saturation of the area signal in the event of an incipient input to trigger the switching function (left event). Although a certain rise in the area signal can be seen for the swipe as well (right event), this is considerably greater in the case of the left event, however.

It is advantageously assumed below that there is a threshold value for the slope of the force signal K(t) that is consistently exceeded when an input is used to trigger the switching function and is not (or not consistently) exceeded when a swipe is input. The time window defined by D_Max_Suspend_Cycles can now be significantly reduced if the algorithm outlined for solution approach A is modified as follows:
  int D_OKpress_Detection_Sensitivity
  int D_Max_Suspend_Cycles
  int D_OKpress_DeadTime
  int D_ForceGradient_Threshold Consider the time period of the last D_OKpress_Detection_Sensitivity values of the area signal.

If the area signal has risen at least once within this time period, set SuppressGesturePositionEnd="TRUE", otherwise set SuppressGesturePositionEnd="FALSE"

If at least D_Max_Suspend_Cycles signal cycles have elapsed since the first (based on a current gesture input) setting* of SuppressGesturePositionEnd="TRUE" and the force signal has not risen by at least D_ForceGradient_Threshold in the last signal cycle, set SuppressGesturePositionEnd="FALSE"

If the switching function was triggered within the last D_OKpress_DeadTime signal cycles, disregard and delete all detected swipes.

Here:
D_OKpress_Detection_Sensitivity:=number of elapsed signal cycles which were used for the consideration. The higher this value, the more sensitive the filter, but also the higher the rate of "false positives".

D_Max_Suspend_Cycles:=maximum number of signal cycles, for which SuppressGesturePositionEnd can be kept at the value "FALSE".

D_OKpress_DeadTime:=number of signal cycles, for which the outputting of swipes is suppressed following triggering of the switching function.

int D_ForceGradient_Threshold:=minimum value by which the value of the force signal must rise so that the filtering remains active even after the time defined by D_Max_Suspend_Cycles has elapsed.

*Alternative variant: If since the last (based on a current gesture input) setting of SuppressGesturePositionEnd="TRUE" . . . This preferably restarts a timer in the case of fluctuations in the area signal, among other things.

Just like the area signal, the force signal is generally subject to signal noise and is therefore not strictly monotonically increasing, even in the event of an incipient input to trigger the switching function. Similar to the use of OKpress_Detection_Sensitivity, a tolerance range could be defined here, with the same advantages and disadvantages. Since the force signal is more reliable than the area signal in this exemplary embodiment, a limit to at most 2 signal cycles/time intervals i is sufficient.

As described in the remarks concerning solution approach A, it was previously assumed that the area signal decreases towards the end of an intentional finger movement and therefore, with a monotonically rising curve of the area signal, an input to trigger the switching function and not a gesture input should be assumed.

Unfortunately, as shown in FIG. 6, this is not always the case; in particular with finger inputs upwards on the input area, the finger is often not moved as a whole, but merely extended from the thumb end joint. In some instances, this leads to a monotonic increase in the finger contact area over the complete movement duration. As a result, both solutions presented above recognize a "false positive", i.e., the intentional, valid swipe is erroneously interpreted as an incipient input to trigger the switching function, and disregarded. This problem is preferably solved as follows.

Trials using human subjects show that unintentional swipes in the initial phase of the input movement are usually made downwards, rarely in the horizontal direction and virtually never upwards. Therefore, when inputting gestures upwards, "false positives" can easily be avoided by deactivating the filtering for this direction.

Whether the filtering should also be active for horizontal swipes or not depends on the respective application. Further investigations are necessary here to weigh up the advantages and disadvantages. Advantageously, the filtering for individual input directions can be freely selected.

For this purpose, the direction of the finger movement is classified according to the following enumeration:
  enumGESTURE {Undefined, Up, Down, Left, Right}

For each of the directions Up, Down, Left, Right, a Boolean value can now be used to configure whether the filtering should be active or not.

The above-described solution approaches A and B are thus advantageously extended by the following condition:
  GESTURE GestureDirection
  Bool FilterUp
  Bool FilterDown
  Bool FilterLeft
  Bool FilterRight
  If
  GestureDirection==Up && FilterUp==FALSE)
  or
  GestureDirection==Down && FilterDown==FALSE)
  or
  GestureDirection==Left && FilterLeft==FALSE)
  or
  GestureDirection==Right && FilterRight==FALSE)
  then
  set SuppressGesturePositionEnd=FALSE FIG. 7 shows a highly schematized flow chart of an inventive method for selecting input fields displayed on a screen and/or for activating input content displayed in a selected input field on the screen by means of manual inputs into an input area of an input interface, wherein the input interface is designed for the haptic input of gestures into the input area, in order to control the selection of an input field, and for the activation of input content of a selected input field by triggering an electrical switching function of the input interface by means of exerting a predefined minimum force on the input area. The method comprises the following steps. In a first step 101, a displacement vector $V(POS(t_1), POS(t_2))$ is ascertained from ascertained input positions $POS(t_1), POS(t_2)$ of a manual, continuous input of gestures into the input area at a first point in time $t_1$ and a second point in time $t_2$, where t:=time and $t_1 < t_2$. In a further step 102, an absolute value $|F(t)|$ of a surface area $F(t)$, with which the manual gesture input acts on the input area, is ascertained. In a further step 103, provided that: $|F(t_2)| < |F(t_1)|$: the input field which is closest to a position $POS_{SCREEN}(POS(t_1))$ associated with the position $POS(t_1)$ on the screen as seen in the direction of the displacement vector $V(POS(t_1), POS(t_2))$ is selected.

FIG. 8 shows a highly schematized design of an inventive device. Device for selecting input fields displayed on a screen 201 and/or for activating input content displayed in a selected input field on the screen by means of manual inputs into an input area of an input interface 202, wherein the input interface 202 is designed and configured for the haptic input of gestures into the input area, in order to control the selection of an input field, and for the activation of input content of a selected input field by triggering an electrical switching function of the input interface 202 by means of exerting a predefined minimum force on the input area.

The device comprises an evaluation means 203, which is designed and configured to ascertain a displacement vector $V(POS(t_1),POS(t_2))$ from ascertained input positions $POS(t_1),POS(t_2)$ of a manual, continuous input of gestures into the input area at a first point in time $t_1$ and a second point in time $t_2$, where t:=time and $t_1<t_2$; and furthermore to ascertain an absolute value $|F(t)|$ of a surface area $F(t)$, with which the manual gesture input acts on the input area.

The device furthermore comprises a control means 204, which is designed and configured such that, provided that: $|F(t_2)|<|F(t_1)|$, the input field which is closest to a position $POS_{SCREEN}(POS(t_1))$ associated with the position $POS(t_1)$ on the screen as seen in the direction of the displacement vector $V(POS(t_1),POS(t_2))$ is selected.

Although the invention has been illustrated and elucidated in detail by preferred exemplary embodiments, the invention is not restricted by the examples disclosed, and a person skilled in the art can easily derive other variations therefrom without departing from the scope of protection of the invention. It is therefore clear that a plurality of possible variations exist. It is likewise clear that embodiments mentioned by way of example actually only represent examples that should in no way be regarded as limiting, for example, the scope of protection, the possible applications, or the configuration of the invention. Rather, the preceding description and the description of the figures enable a person skilled in the art to implement the exemplary embodiments in a specific way, wherein the person skilled in the art, being aware of the disclosed inventive idea, can make numerous changes, for example with regard to the function or the arrangement of individual elements, mentioned in an exemplary embodiment, without departing from the scope of protection defined by the claims and the legal equivalents thereof, such as further explanations in the description.

The invention claimed is:

1. A method for selecting input fields displayed on a screen and for activating input content displayed in a selected input field on the screen by manual inputs into an input area of an input interface, wherein the input interface is configured for haptic input of gestures into the input area in order to control the selection of an input field, and for the activation of input content of a selected input field by triggering an electrical switching function of the input interface by exerting a predefined minimum force on the input area, the method comprising the following steps:

determining a displacement vector $V(POS(t_1),POS(t_2))$ from determined input positions $POS(t_1),POS(t_2)$ of a manual, continuous input of gestures into the input area at a first point in time $t_1$ and a second point in time $t_2$, where t=time and $t_1<t_2$;

determining an absolute value $|F(t)|$ of a surface area $F(t)$ with which the manual, continuous input of the gesture acts on the input area;

provided that $|F(t_2)|<|F(t_1)|$, selecting the input field that is adjacent or at least closest to a position $POS_{SCREEN}(POS(t_1))$ associated with the position $POS(t_1)$ on the screen as seen in a direction of the displacement vector $V(POS(t_1),POS(t_2))$, wherein upon triggering the electrical switching function at the point in time $t_2$ a function associated with the input content of the selected input field is activated; and provided that $|F(t_2)|>|F(t_1)|$, the displacement vector $V(POS(t_1),POS(t_2))$ is disregarded and a function associated with the position $POS_{SCREEN}(POS(t_1))$ is activated, wherein the preceding method steps are only performed for one or more predefined directions of the displacement vector $V(POS(t_1), POS(t_2))$.

2. The method of claim 1, wherein if, starting from the first point in time $t_1$, the absolute value $|F(t)|$ of the surface area is increased for a predefined time duration $\Delta t_{MAX}$, the displacement vector $V(POS(t_1),POS(t_2))$ is determined for the second point in time $t_2=t_1+\Delta t_{MAX}$ defined as an end of the predefined time duration $\Delta t_{MAX}$ and the input field adjacent or at least closest to a position $POS_{SCREEN}(POS(t_1))$ associated with the position $POS(t_1)$ on the screen as seen in the direction of the displacement vector $V(POS(t_1),POS(t_2))$ is selected.

3. The method of claim 1, wherein the input field adjacent or at least closest to the position $POS_{SCREEN}(POS(t_1))$ as seen on the screen is only selected if a force profile $K(t)$ acting on the input area during the gesture input in the time period $t_1$ to $t_2$ in each case has gradients grad $(K(t))$ below a predefined gradient GRAD: grad $(K(t))<$GRADK.

4. The method of claim 1, wherein if, after the first point in time $t_1$, the absolute value $|F(t)|$ of the surface area increases until the electrical switching function is triggered, the input field selected on the screen at the first point in time $t_1$ is selected with the triggering of the switching function and the input content of this input field is activated.

5. The method of claim 1, wherein the displacement vectors $V(POS(t_1),POS(t_2))$ determined after triggering the switching function for a predefined period of time $\Delta t_{SWITCH}$ for the selection of an input field are disregarded.

6. The method of claim 1, wherein an input field is only selected or an input content of a selected input field is only activated provided that an absolute value $|V(POS(t_1),POS(t_2))|$ of the displacement vector $V(POS(t_1),POS(t_2))$ exceeds a predefined limit value.

7. The method of claim 1, wherein an increase or a decrease in the absolute value $|F(t)|$ of the surface area $F(t)$ is detected/evaluated in each case in predefined tolerance time ranges.

* * * * *